Sept. 18, 1962 L. H. LEONARD, JR 3,054,272
ABSORPTION REFRIGERATION SYSTEMS AND METHOD
OF OPERATING THE SAME
Filed Jan. 13, 1960 5 Sheets-Sheet 1

INVENTOR.
LOUIS H. LEONARD JR.
BY
ATTORNEY.

INVENTOR.
LOUIS H. LEONARD JR.

ATTORNEY.

INVENTOR.
LOUIS H. LEONARD JR.
BY
Herman Seid
ATTORNEY.

Sept. 18, 1962     L. H. LEONARD, JR     3,054,272
ABSORPTION REFRIGERATION SYSTEMS AND METHOD
OF OPERATING THE SAME Filed Jan. 13, 1960     5 Sheets-Sheet 5

INVENTOR.
LOUIS H. LEONARD JR.
BY
ATTORNEY.

United States Patent Office 3,054,272
Patented Sept. 18, 1962

3,054,272
ABSORPTION REFRIGERATION SYSTEMS AND
METHOD OF OPERATING THE SAME
Louis H. Leonard, Jr., Dewitt, N.Y., assignor to Carrier
Corporation, Syracuse, N.Y., a corporation of Delaware
Filed Jan. 13, 1960, Ser. No. 2,203
22 Claims. (Cl. 62—103)

This invention relates to absorption refrigeration systems and to a control arrangement therefor and, more particularly, to an absorption refrigeration system employing a saline solution as an absorbent, and a medium miscible therewith as a refrigerant, and to a method of operating the same.

Absorption refrigeration systems of the type employed in commercial air conditioning, for example, as disclosed and claimed in Leonard United States Patent No. 2,918,807 granted December 29, 1959, entitled "Absorption Refrigeration Systems of the Internal Coil Type," while highly satisfactory for the intended purpose, possess a substantial disadvantage caused by scaling in the condenser tubes. In operation, at partial load, flow of condensing water through the condenser tubes is decreased thus increasing the condensing temperature. Scaling doubles for every ten degrees rise in water temperature. Naturally, this increases the temperature of the condensing water passing through the tubes with the result that precipitation of impurities from the water increases greatly causing scaling of the tubes, and blocking passage of condensing water therethrough. This results in undesirable machine operation, requiring frequent cleaning of the tubes, either by mechanical brushing or messy chemical cleaning. In some cases, replacement of the condensing tubes within a short time interval is required due mainly to the damage done by chemical cleaning. Too, the rate of steam consumption in the generator does not decrease proportionately to the reduction in load imposed upon the system so that at partial loads steam consumption is not as economical as it should be resulting in costs of operation which, in some cases, are objectionable.

The chief object of the present invention is to provide an absorption refrigeration system and control arrangement therefor which obviates such disadvantages inherent in systems now employed in industry.

An object of the invention is to provide a method of operation of an absorption refrigeration system which greatly reduces scaling in the generator tubes, which improves steam consumption rates at partial load and insures stable operation down to zero percent load, without necessitating shutting down the machine.

A further object is to provide an absorption refrigeration system including an improved control arrangement which automatically varies flow of weak solution in heat exchange relation with heating medium in the generator thereby reducing the capacity of the system upon partial load operation with resulting economies in rates of steam consumption and which serves to retard scaling of condenser tubes and which automatically increases flow of weak solution in heat exchange relation with heating medium in the generator as load imposed upon the system increases, thus increasing the capacity of the system as the load increases.

A further object is to provide an improved method of operation of an absorption refrigeration system. Other objects of the invention will be readily perceived by reference to the following description.

The term "weak solution" is used herein to describe a solution weak in absorbing power. The term "strong solution" is used herein to define a solution strong in absorbing power.

The preferred absorbing solution is a solution of lithium bromide in water. The preferred refrigerant is water. Concentration of solution leaving the generator may vary but preferably is about 66% during full load operation of the system.

This invention relates to an absorption refrigeration system comprising, in combination, an absorber, an evaporator, a generator and a condenser, means for passing weak solution from the absorber to the generator, means for passing strong solution from the generator to the absorber, means for supplying heating medium to the generator, means for supplying condensing medium to the condenser, and means adapted upon partial load imposed on the system to precipitate salt from the solution in the generator thereby decreasing the capacity of the system, said precipitating means, upon an increase in load imposed upon the system, permitting solution in the generator to absorb the precipitated salt thereby increasing the capacity of the system.

This invention further relates to an absorption refrigeration system which comprises in combination an absorber, an evaporator, a generator, a condenser, means for passing strong solution from the generator to the absorber, means for passing weak solution from the absorber to the generator, means for supplying heating medium to the generator, means for supplyng condensing medium to the condenser, a heat exchanger for placing the strong and weak solutions in heat exchange relation during their passage between the absorber and generator, and means for diverting at least a portion of the weak solution prior to its passage in heat exchange relation with heating medium in the generator to mix with strong solution passing from the generator to the absorber prior to the passage of strong solution through the heat exchanger.

This invention further relates to a method of regulating the operation of an absorption refrigeration system employing a saline solution as an absorbent and a material miscible therewith as a refrigerant in which the steps consist in precipitating salt from solution in the generator to decrease the capacity of the system and, upon a demand for increased capacity, absorbing the precipitated salt in solution in the generator.

The attached drawings illustrate preferred embodiments of the invention, in which.

Figure 1:
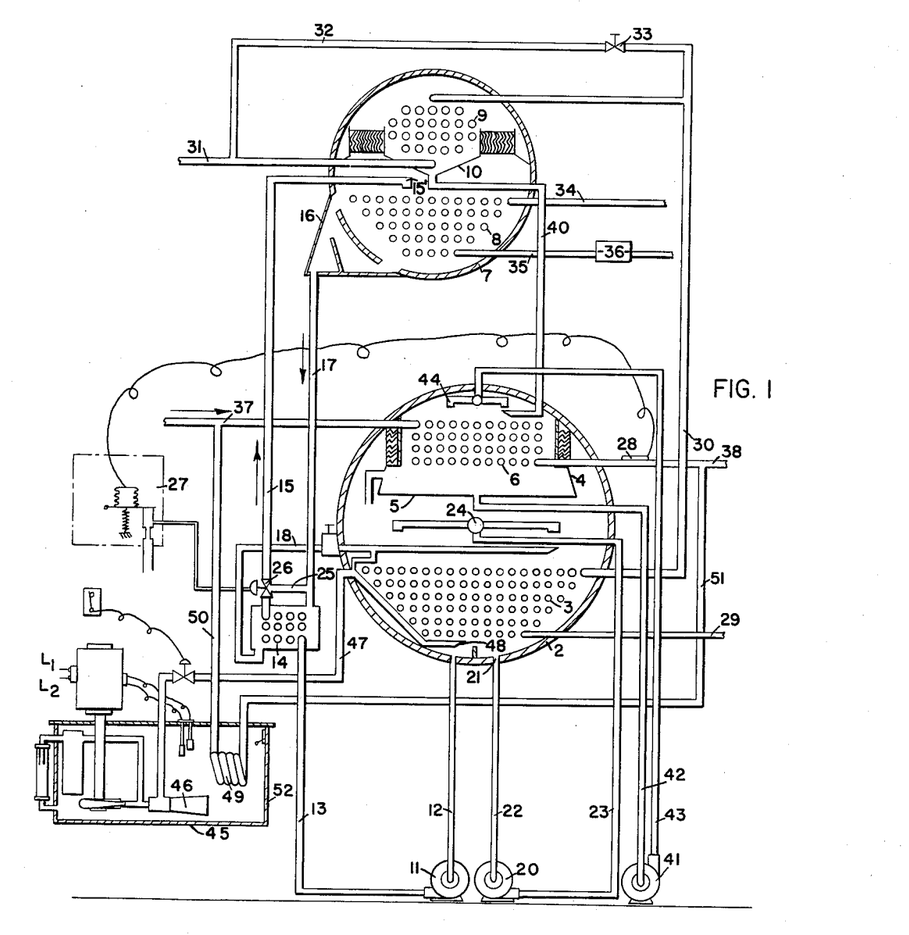
FIGURE 1 is a diagrammatic view illustrating the absorption refrigeration system and control arrangement of the present invention.

Referring to the attached drawings, there is illustrated diagrammatically in FIGURE 1 the absorption refrigeration system of the present invention. The system comprises a shell 2 containing a plurality of tubes 3 which cooperate with the shell to form an absorber. Placed in shell 2 above the absorber is a pan-like member 4 which cooperates with shell 2 to form an evaporator. The evaporator includes a plurality of tubes 6 extending longitudinally of the shell above pan 4; medium to be cooled passes through these tubes in heat exchange relation with liquid refrigerant sprayed thereover.

A second shell 7, preferably, is placed above the first shell. Tubes 8 extend in the lower portion of shell 7 and cooperate with shell 7 to form a generator. A plurality of tubes 9 are placed in the upper portion of shell 7 to form a condenser. The tubes 9 cooperate with a pan-like member 10 to form the condenser.

Pump 11 withdraws weak solution from absorber 3 through line 12. Pump 11 forwards weak solution through line 13 to heat exchanger 14 in which the weak solution is placed in heat exchange relation with strong solution returning from the generator, as hereinafter described. The weak solution is then forwarded from the heat exchanger 14 through line 15 to generator 8 being discharged therein through suitable spray arrangement 15'. Arrangements 15' may include two inlet pipes located at each end of the generator with the pipe placed nearest to the overflow arrangement 16 being placed slightly lower than the other for more satisfactory partial load operation. Strong solution flows from generator 8 through the overflow arrangement 16, line 17, heat exchanger 14 and line 18 to the absorber, preferably, being discharged therein adjacent one end of shell 2; that is, strong solution flows through forces of gravity from the generator to the absorber. It will be understood, of course, if desired, the strong solution may be discharged in the absorber over the tubes therein.

Pump 20 serves as an absorber pump and is employed to withdraw solution of intermediate concentration from absorber 3 through outlet 21 and line 22. Pump 20 forwards the solution of intermediate concentration through line 23 to the spray arrangement 24 of the absorber. Spray arrangement 24 serves to distribute the recirculated solution over the tubes throughout the length of absorber 3. It will be understood the strong solution mixes to some extent with solution in the absorber and that complete mixing occurs as the pump 20 forwards the mixed solution so that a solution having a concentration intermediate the concentration of the strong and weak solutions is circulated. Reference is made to United States Patent No. 2,840,997, granted July 1, 1958, for a more detailed description of the flow of solution in the system.

A bypass line 25 is placed adjacent heat exchanger 14 and serves to connect line 15 with line 17 on the generator side of the heat exchanger. A three-way modulating valve 26 is placed, preferably, at the juncture of line 25 with line 15, for a purpose hereinafter explained. It is desirable to place valve 26 as close as possible to the heat exchanger 14 to assure that a head exists in the weak solution line. Thus if the valve is modulated to assure that all weak solution flow is through the bypass line 25, and the valve leaks to the weak solution line to the generator, the head in such line will prevent weak solution bleeding to the generator. As indicated in FIGURE 1, valve 26 is a pneumatically operable valve actuated by a control 27 responsive to temperature indicated by a bulb 28. The function and operation of this control arrangement will be described in more detail hereinafter.

Condensing water is forwarded by a pump (not shown) through line 29 to the tubes 3 of the absorber. The condensing water passes from the tubes 3 of the absorber through line 30 to the tubes 9 of the condenser. Condensing water leaves the tubes 9 of the condenser through line 31. A bypass line 32 is provided about the tubes 9 of the condenser extending from line 30 to line 31. A manual valve 33 is placed in bypass line 32. This bypass permits flow of condensing water through the tubes of the condenser to be adjusted at full load when a system is installed. Thereafter, in the present invention, no adjustment of the flow of condensing water through the tubes of the condenser is required.

Steam is supplied to the tubes 8 of the generator through line 34. If desired, a suitable pressure regulating valve (not shown) may be placed in line 34 to assure desired steam pressure in the generator. Ordinarily, however, the system of the present invention employs steam at 12 pounds pressure and steam at such pressure is ordinarily supplied from the usual boilers employed in the industry. Steam condensate leaves the tubes of generator 8 through line 35, a suitable steam-trap 36 being provided in line 35 to assure that only condensate leaves the generator.

Medium to be cooled is forwarded by a pump (not shown) through a line 37 to the tubes 6 of the evaporator. The cooled medium leaves the tubes 6 through line 38 and is forwarded to a place of use such as the central station of an air conditioning system. The medium, after passing through the central station, returns to the evaporator 4 through line 37 to be again cooled and reused. Preferably, bulb 28 of control arrangement 27 is placed on line 38 to reflect the temperature of cooled medium leaving the evaporator which, in effect, indicates the load imposed upon the system.

Condensate leaves pan 10 of the condenser through line 40 and is returned to the evaporator and discharged therein over the tubes 6 to wet the tubes. It will be appreciated the refrigerant is flashed or vaporized by the heat exchange relation with medium passing through the tubes. Flashed vapor passes to the absorber to be absorbed by solution therein.

Pump 41 serves to recirculate liquid refrigerant collected in the evaporator about the evaporator. Pump 41 is connected to the evaporator by line 42 to withdraw liquid refrigerant therefrom. Pump 41 forwards the liquid refrigerant through line 43 to spray arrangement 44 of the evaporator, the liquid refrigerant flash-cooling upon discharge in the evaporator, remaining liquid refrigerant wetting the tubes to cool medium passing through the tubes. The heat exchange relation between medium passing through the tubes and the liquid refrigerant on the exterior of the tubes evaporates liquid refrigerant, the vapor passing to the absorber as previously described.

A suitable purge arrangement 45 is provided to remove non-condensible gases from the absorber. The ejector 46 of purge arrangement 45 is connected by line 47 to a purge line 48 extending longitudinally of the absorber. The cooling coil 49 of purge arrangement 45 is connected to line 37 by line 50 and to line 38 by line 51, permitting medium to be employed for cooling solution in the purge tank 52. Purge arrangement 45 is disclosed and claimed in application, Serial No. 565,324 filed February 14, 1956, and reference is made to such application for a more complete description of the purging arrangement.

Considering the control arrangement for the present absorption refrigeration system, as previously described, bypass line 25 connects weak solution line 15 and strong solution line 17 adjacent the heat exchanger 14, modulating three-way valve 26 being placed at the juncture of bypass line 25 and weak solution line 15 to proportion the quantities of weak solution flowing through such lines. It will be understood that weak solution flow to the heat exchanger is constant under all load conditions. Valve 26 is connected to a pneumatic control 27 which in turn is actuated by means of a bulb 28 placed adjacent line 38 in a position to sense the temperature of cooled medium leaving the evaporator. It will be appreciated bulb 28 may be placed in contact with line 38 or may be placed in line 38, as desired. Valve 26 is so designed as to prevent air leakage into the machine.

Under full load condition, all weak solution passes through line 15 to the generator and is discharged therein. However, as the load imposed on the system decreases as reflected by the temperature of chilled water leaving the evaporator, valve 26 is actuated to divert a portion of the flow through the weak solution line through bypass line 25 to the strong solution line 17. So diverting weak solution varies the concentration of solution supplied to the absorber in accordance with cooled medium requirements. Generally speaking, only enough solution is sent to the generator for reconcentration as is required to keep the absorber solution at the desired concentration to meet load requirements. Although the generator produces extremely high concentrations of salt under part load conditions, heretofore considered unsafe due to crystallization problems in the solution heat exchanger, the fact that the highly concentrated salt solution leaving the generator is immediately diluted with extremely dilute solution prevents solidification problems in the heat exchanger.

Figure 3:
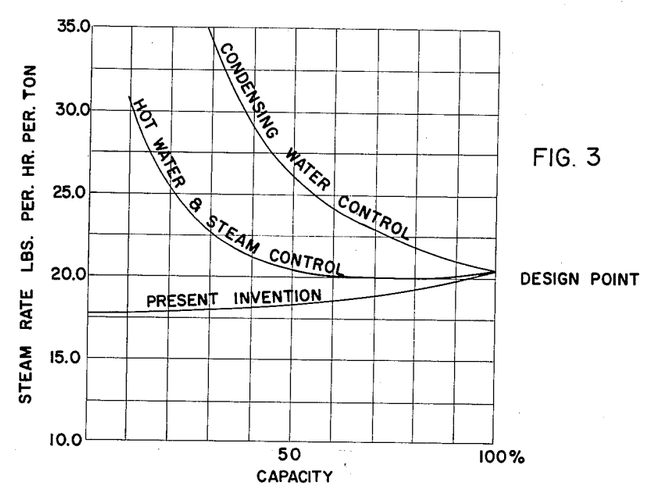
FIGURE 3 is a graph comparing various types of controls used in absorption refrigeration systems with regard to the quantities of steam required during operation at partial load.

In FIGURE 3, there is disclosed a graph which compares steam rates employed in absorption refrigeration systems as against the type of control used therein. It will be observed that the present control greatly reduces the rate of consumption of steam at partial loads over other controls heretofore employed because at partial loads, the small amount of solution sent to the generator is reconcentrated through the widest possible range. The smaller the solution flow and the wider the concentration range, the higher machine efficiency.

Figure 4:
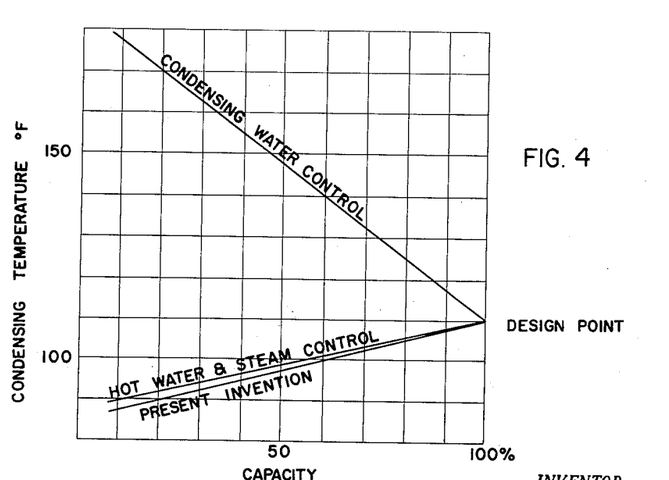
FIGURE 4 is a graph similar to the graph shown in FIGURE 3 in which the condensing temperature is plotted against the capacity of the system.

Similarly, in FIGURE 4, there is illustrated a graph comparing the condensing temperature with regard to capacity of systems embodying various types of controls. Again, it will be observed that the control arrangement of the present arrangement greatly reduces the condensing temperature at partial load operation, thus rendering the system less susceptible to scaling, and, in fact, greatly reducing the amount of scaling in the condenser tubes for if less heat is rejected in the absorber, then the condensing water supplied to the condenser is at a lower temperature.

Figure 5:
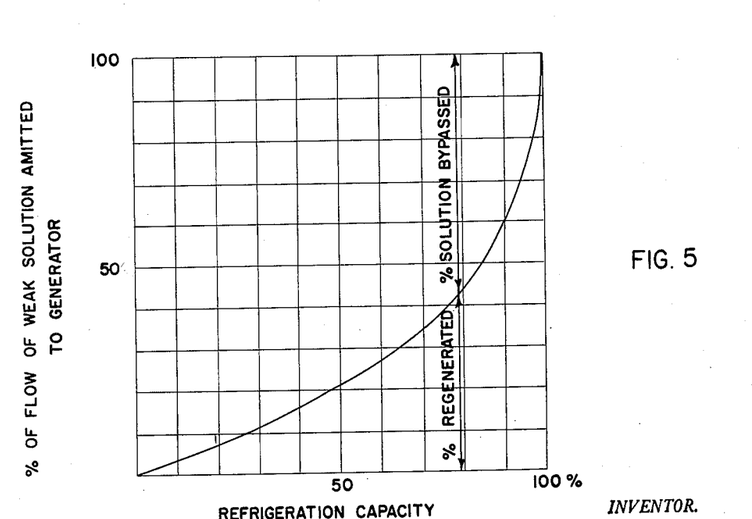
FIGURE 5 is a graph illustrating operation of the control arrangement of the present invention in diverting or bypassing weak solution about the generator.

In FIGURE 5, there is shown a graph which illustrates the percentage of weak solution bypassing the generator as compared to the refrigerating capacity of the absorption refrigeration system. It will be observed by reference to this graph that weak solution flow to the generator on part load operation is reduced more than the reduction in load thus improving partial load steam rates.

Figure 6:
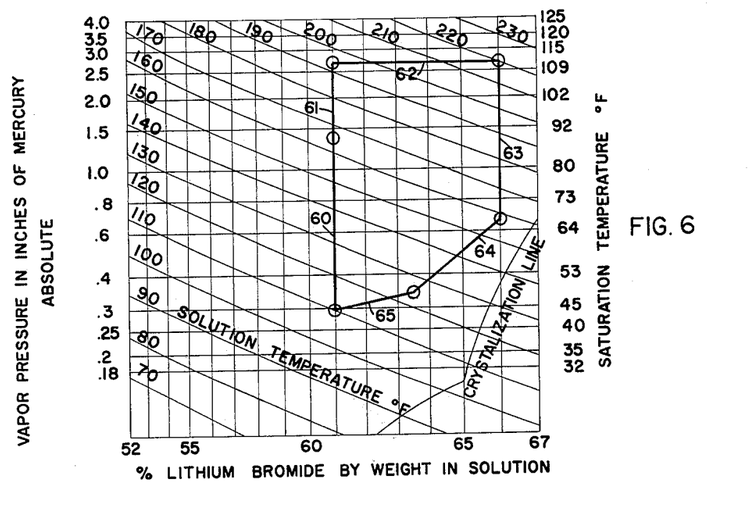
FIGURES 6 to 12, inclusive, are cycle diagrams of the present absorption refrigeration system illustrating operation under various load conditions.
Figure 7:
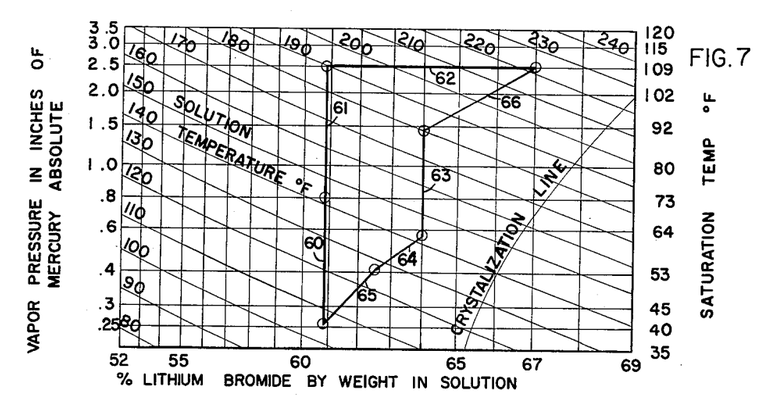
Figure 8:
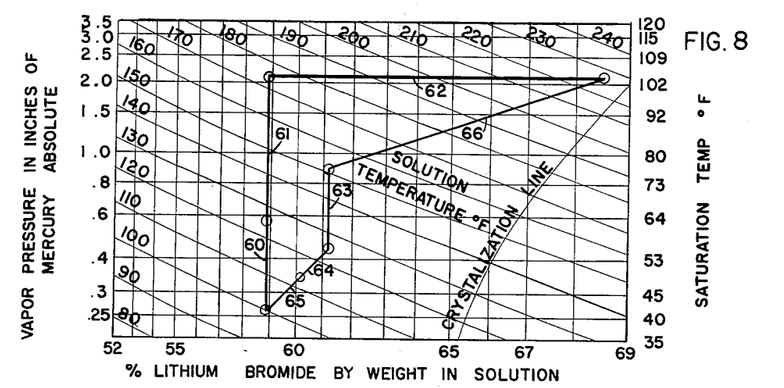
Figure 9:
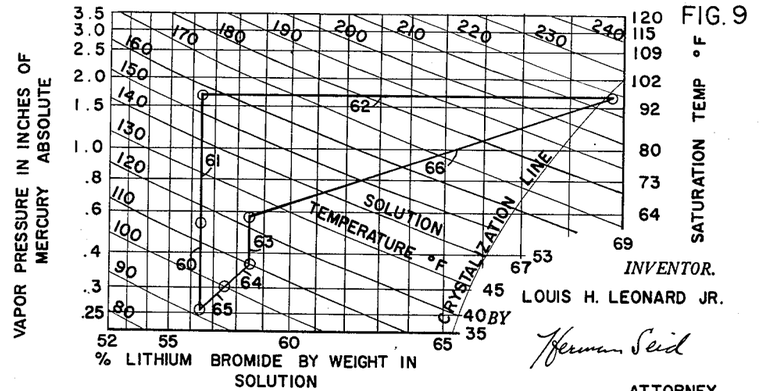
Figure 10:
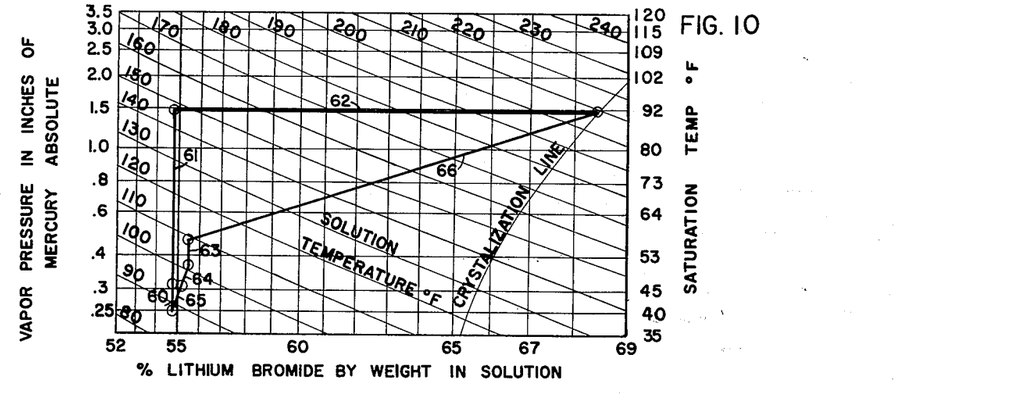
Figure 11:
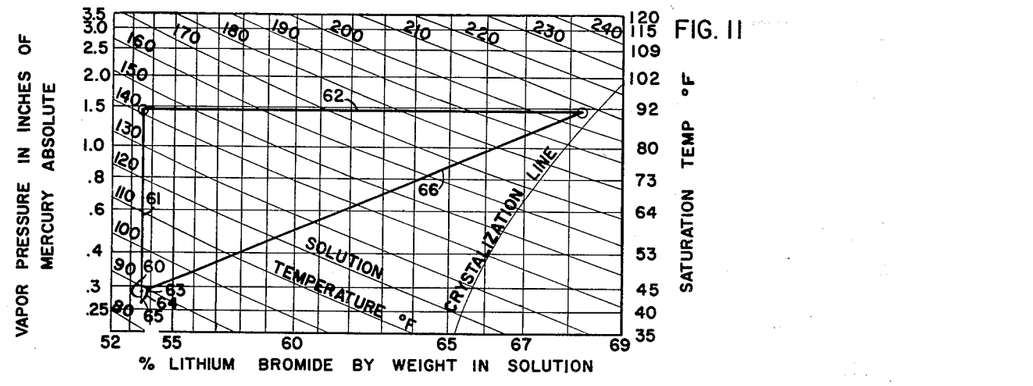

In FIGURES 6 to 12, I have illustrated the absorption refrigeration system cycle at various loads. FIGURE 6 illustrates the cycle at full load; FIGURE 7, the cycle at 80% load; FIGURE 8, the cycle at 60% load; FIGURE 9, the cycle at 40% load; FIGURE 10, the cycle at 20%; FIGURE 11, the cycle at 1% load; and FIGURE 12, the cycle at zero load. Since the system is most susceptible to crystallization in the heat exchanger, it will be observed that upon decrease in load, the cycle moves away from the crystallization line. It will be appreciated these figures should be studied in conjunction with FIGURE 5 to understand fully the percentage of weak solution bypassing the generator at partial load operation. It should also be understood that weak solution flow to the heat exchanger is constant under all load conditions.

Considering FIGURE 6, line 60 illustrates the flow of weak solution through the heat exchanger 14. It will be observed that the solution during full load operation is raised in temperature from approximately 110° F. to approximately 165° F. Line 61 illustrates the preheating of solution in the generator. It will be observed that the solution is preheated in the generator to a temperature of approximately 195° F. Line 62 illustrates the passage of solution through the generator. It will be observed that its temperature is increased to approximately 220° F. while its concentration is increased to approximately 66% by weight of lithium bromide. Line 63 illustrates the passage of strong solution leaving the generator through the heat exchanger. While the concentration of solution remains substantially constant, it will be appreciated its temperature is reduced to approximately 158° F. Note the distance of line 63 from the crystallization line; this is the closest line 63 approaches the crystallization line during operation of the system. Line 64 serves to illustrate the effect in the cycle of recirculation of solution in the absorber and dilution of strong solution by the solution of intermediate concentration mixed therewith. It will be observed the concentration of solution is reduced to approximately 63.5% while the temperature of the solution of intermediate concentration is reduced to approximately 125° F. Line 65 serves to illustrate the passage of solution through the absorber. Again, it will be observed that the concentration of solution is reduced to approximately 61% while the temperature of the solution is reduced to approximately 110° F. It will be understood that at full load operation none of the solution is diverted through line 25 to the strong solution line.

FIGURE 7 discloses a cycle diagram in which the load or capacity of the system is at about 80%. Lines 60 to 65, inclusive, are the same as described in connection with FIGURE 6. However, during operation of the system at 80% load, it will be appreciated that some portion of the weak solution is diverted through line 25 to strong solution line 17. As stated above, FIGURE 5 illustrates the amount of weak solution bypassed at 80% load. Since some portion of the solution is bypassed and mixed with strong solution it will be appreciated that cycle flow is affected. Line 66 serves to illustrate this effect upon the absorption refrigeration system. Since less weak solution is passed through the generator it will be appreciated that the temperature of solution flowing through the generator is increased to approximately 225° F. as compared to about 220° F. at full load operation. Bypassing weak solution and mixing the weak solution with strong solution prior to its entrance into the heat exchanger simultaneously dilutes and cools the solution. This effect is shown at line 66. It will be observed that the temperature of the solution entering the heat exchanger is reduced to approximately 180° F., while the concentration of the solution is reduced from approximately 68% to approximately 64%. In other respects the cycle so shown is similar to the cycle described in connection with FIGURE 6 illustrating full load operation of the machine. Note that line 63 has moved away from the crystallization line. This is the part of the cycle that is adversely troubled with solidification problems, that endangers machine operations.

FIGURE 8 illustrates a cycle in which the system is operating at approximately 60% load. Various lines illustrating the passage of solution through the various portions of the machine are the same as previously described.

In FIGURE 9, the lines illustrating the passage of solution through the machine are the same as previously described. It will be observed, however, that in the cycle shown in FIGURE 9 in which the system is operating at approximately 40% capacity, solution entering the generator is about 115° F. and is preheated in the generator to about 158° F. FIGURE 5, of course, illustrates the amount of solution bypassing the generator under these conditions. It will be observed, referring to FIGURE 9, that solution in the generator is heated to a temperature of approximately 218° F., and that the concentration of the solution is at such a point that crystallization occurs. Thus, a substantial portion of the salt in solution has precipitated and crystallized about the tubes in the generator interfering with heat transfer. The solution passing through the generator is about the consistency of a thick syrup. In other respects the solution is substantially the same as previously described. The same is true of FIGURES 10 and 11, except that by reference to FIGURE 5 it will be observed that greater portions of solution are bypassed about the generator and that in the generator the solution appears to be a thick slush, or has so precipitated that small cakes of salt have been formed.

Figure 12:
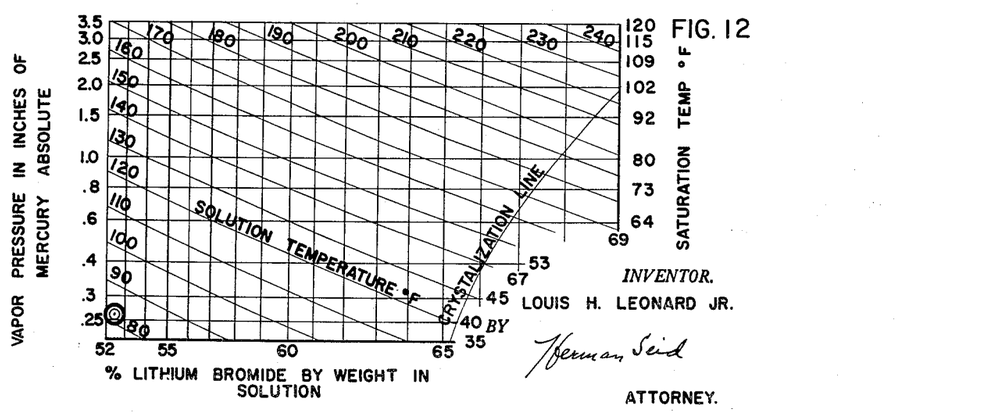

In FIGURE 12, the system is shown in operation at zero load. At zero load, all of the solution in the generator has crystallized, completely preventing heat input to the machine. All of the weak solution bypasses the generator without substantial change in temperature or concentration so that operation of the system is reflected by a point rather than by lines which indicate its change in temperature and concentration as it passes through the various elements of the system.

While I have described the control arrangement of the present invention as being a pneumatic control, it will be appreciated that any electrical or electronically operated controls may be provided.

Figure 2:
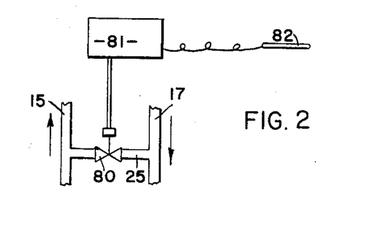
FIGURE 2 is a diagrammatic view illustrating a modified control arrangement.

In FIGURE 2, there is diagrammatically illustrated a modified form of control. In this case a modulating valve 80 is placed in bypass line 25. An electrical control 81 of any desired type is provided to regulate valve 80 to determine the quantities of weak solution flowing to the generator and through line 25 respectively, the electrical control being regulated by means of a bulb 82 adapted to be placed on line 38 to reflect the temperature of cooled medium leaving the evaporator. In this case, valve 80 may be sized so as to divert a portion of weak solution from line 15 to strong solution line 17, depending upon the capacity for which it is desired to compensate, the weak solution mixing with strong solution in line 17 prior to its entrance into heat exchanger 14.

Considering the operation of the absorption refrigeration system, it will be appreciated that the machine is designed to operate at a desired steam pressure, for example, 12 pounds, because most existing steam boilers are designed to provide steam at such pressure. It will be appreciated other pressures may, of course, be used and in such case a pressure regulating valve may be placed in the steam line to assure that steam at the desired pressure is provided to the generator. I have described too a bypass about the tubes of the condenser for condensing water. It will be appreciated that in many cases such bypass is not necessary, but that it is desirable in order to adjust the machine to operation at full load conditions. After the machine is adjusted to operation at full load conditions, the condenser bypass need not be actuated for further operation. If desired, of course, for this purpose steam pressure may be varied.

Considering operation of the absorption refrigeration system, it will be appreciated that at start-up the generator contains a large amount of precipitated or crystallized lithium bromide salt. In some cases, it appears as if the generator tubes were covered with a pile of white snow. It will be appreciated there is no need for manual or automatic steam valves to be closed during the shutdown period since the low thermal conductivity of the solid salt serves as an excellent insulator to shield the generator from the hot steam in the tube. Under such conditions, the salt will dissolve at least partially during shutdown if the valve is closed which is desirable. The solution in the remainder of the system including the heat exchanger is under extremely dilute conditions. When the machine is started, medium to be cooled is forwarded through line 37 to the tubes 6 of evaporator 4 and leaves the tubes 6 of evaporator 4 through line 29. At start-up, the pumps are actuated, pump 11 withdrawing weak solution from the absorber through line 12 and forwarding the weak solution through line 13, heat exchanger 14 and line 15 to generator 8. It will be appreciated valve 26 gradually opens to permit full solution flow to the generator. In the generator, the solution flows over the top of the salt pile gradually dissolving the solid salt and returning the concentrated solution to the absorber where it can immediately go to work to produce useful refrigeration. It will be appreciated that instead of needing to wait for the overall solution concentration in the machine to build up, the latent capacity of the stored solid salt in the generator is instantly ready to go to work. This is virtually impossible with any other type of control arrangement.

Refrigerant vapor is boiled from the solution in the generator 8, vapor passing to condenser 9 and being condensed therein, the condensate returning to the evaporator through line 40.

Strong solution leaves the generator through overflow arrangement 16, line 17, heat exchanger 14, line 18 and is discharged preferably over an end of the absorber tube bundle. Strong solution is flash-cooled to some slight extent as it is discharged in the absorber. The discharged strong solution mixes with solution in the absorber and is withdrawn from the absorber through outlet 21 and line 22 by pump 20, solution of intermediate concentration so formed being returned to the absorber through line 23 and being sprayed over the tube bundle by spray arrangement 24. It will be appreciated that the mixture of strong solution and solution in the absorber forming the solution of intermediate concentration is further mixed and cooled in passage through the refrigeration system as shown in FIGURES 6 to 11, inclusive.

Pump 41 serves to withdraw liquid refrigerant from the pan 5 of evaporator 4, and to recirculate the liquid refrigerant through lines 42 and 43 to the discharge means 44 of the evaporator. The discharge means 44 sprays the liquid refrigerant over the tubes 6 of evaporator 4. The tubes are wetted by the liquid refrigerant, the wetted refrigerant being vaporized by the heat exchange relation with medium passing through the tubes. Vapor so formed passes outwardly through the eliminators and flows downward to the absorber 3 being absorbed by solution therein.

Vapor condensate is returned from condenser 9 through line 40 to the evaporator being flash-cooled upon discharge therein over tube 6. Thus, the vapor condensate aids in wetting the tubes to cool the medium passing therethrough.

Now, considering operation at full load conditions, the cooled medium rapidly cools down to design conditions and valve 26 remains open to permit the full volume of weak solution to be supplied to the generator to dissolve the solid salt. Assuming the system goes on operation at partial load as indicated by a decrease in the temperature of cooled medium leaving the evaporator reflected by bulb 28, control 27 actuates valve 26 to throttle flow of weak solution to the generator and to bypass some portion of the weak solution to the strong solution line 17 where it mixes with the strong solution prior to the entrance of the solution into the heat exchanger 14. As the weak solution flow to the generator is reduced, and more solution is bypassed or diverted, the solution concentration in the generator gradually decreases, at approximately 50% load approaching the consistency of thick syrup. At approximately 25% load, it appears to be a thick slush. Even though the solution in the generator begins to increase in concentration as soon as the system begins to operate on partial load, the solution leaving the generator is diluted to more than a safe concentration before it reaches the heat exchanger by the addition of weak solution thereto thus preventing precipitation or crystallization in the heat exchanger. In one sense, the present arrangement may be considered as the circulation of solution at zero load with the addition of solid salt or slush thereto as required to provide a solution of higher concentration as the load imposed upon the system increases, that is, to maintain a desired concentration in accordance with the load imposed on the system.

By reference to FIGURES 6 to 11 inclusive it will be appreciated that those portions of the system which are critical to solidification problems, that is, the heat exchanger, the solution piping and the absorber, are farther from the solidification line than is possible with control arrangements heretofore used. It will be appreciated that precipitation of salt in the generator does not interfere with system operation; even though lumps of solid salt may be carried from the generator they are immediately dissolved and diluted by the weak solution which is diverted to the strong solution line.

The present absorption refrigeration system and its control arrangement permit a vast decrease in consumption of steam at partial load operations. Condensing temperatures in the condenser during partial load operations are the lowest possible temperatures which can be obtained, thus greatly reducing tendencies to scaling of the condenser tubes. Under any circumstances, partial load operation of the system even down to zero percent may be assured.

An advantage of the control arrangement of the present absorption refrigeration system resides in its provision as an integral part of the system requiring no field application engineering, installation or the like. The control arrangement may be factory engineered, factory installed, and factory tested.

In the present system, twelve pounds of steam, or less, is employed for all load conditions so that engineering time need not be used in field installations in developing varying steam conditions under partial load operations. Since steam pressures remain constant under all load conditions, corrosion problems due to introduction of air into the steam condensate system under partial load conditions do not arise. Such problems may arise with steam controls with which, as load imposed on the system reduces, operation exists at sub-atmospheric steam conditions permitting air to enter the steam system. No need exists for automatic or manual steam valves during normal operation.

Machine capacity is not reduced by the introduction of a pressure drop in the main steam line.

While at first glance it may appear that serious problems might exist in employing the present control arrangement since experts in the field heretofore have always deemed crystallization or solidification of solution in the system dangerous under any circumstances, the present invention makes use of solidification of salt in the generator to provide cheaper and more efficient control of operation during conditions of partial load operation. In effect, the present control arrangement takes what was heretofore thought a major disadvantage in absorption refrigeration systems employing a saline solution as an absorbent and employs this so-called disadvantage to render control of this system more effective, cheaper and to prevent scaling of condenser tubes. Storage problems are minimized since the solution is diluted by removing solid salt and not by diluting the entire charge.

While I have described a preferred embodiment of the invention, it will be appreciated the invention is not so limited since it may be otherwise embodied within the scope of the following claims.

I claim:

1. In a method of regulating the operation of an absorption refrigeration system employing a saline solution as an absorbent and a material miscible therewith as a refrigerant, the steps which consist in precipitating salt from solution in the generator to decrease the capacity of the system, and, upon a demand for increased capacity, dissolving the precipitated salt in solution in the generator.

2. In a method of operation of an absorption refrigeration system employing a saline solution as an absorbent and a material miscible therewith as a refrigerant, the steps which consist in heating solution in the generator at partial load to a degree that salt precipitates therefrom, and, upon an increase in load imposed upon the system, supplying an increased quantity of solution to the generator to dissolve the precipitated salt thereby increasing the capacity of the system.

3. In a method of operation of an absorption refrigeration system including an absorber, an evaporator, a generator, a condenser and a heat exchanger for strong and weak solutions and employing a saline solution as an absorbent and a material miscible therewith as a refrigerant, the steps which consist in supplying weak solution from the absorber to the generator, supplying strong solution from the generator to the absorber, supplying a heating medium to the generator in heat exchange relation with solution therein, supplying a condensing medium to the condenser in heat exchange relation with vapor therein to condense the same, returning the condensate to the evaporator, and, at partial load, varying the quantity of weak solution passing from the absorber to the generator without affecting the passage of condensing medium through the condenser and passage of heating medium through the generator.

4. In a method of operation of an absorption refrigeration system including an absorber, an evaporator, a generator, a condenser and a heat exchanger for strong and weak solutions and employing a saline solution as an absorbent and a material miscible therewith as a refrigerant, the steps which consist in supplying weak solution from the absorber to the generator, supplying strong solution from the generator to the absorber, circulating a solution of intermediate concentration from the lower portion of the absorber to the upper portion of the absorber, supplying a heating medium to the generator in heat exchange relation with solution therein, supplying a condensing medium to the condenser in heat exchange relation with vapor therein to condense the same, returning the condensate to the evaporator, at partial load, diverting at least a portion of the weak solution to return to the absorber prior to its passage in heat exchange relation with heating medium in the generator, and mixing the diverted weak solution with strong solution prior to the passage of the strong solution to the absorber.

5. A method according to claim 4 in which the diverted weak solution after its passage through the heat exchanger is mixed with strong solution prior to passage of the strong solution through the heat exchanger.

6. A method according to claim 4 in which the quantity of weak solution diverted is responsive to load imposed upon the system.

7. A method according to claim 6 in which the quantity of weak solution diverted is responsive to load imposed upon the system as reflected by the temperature of cooled medium leaving the evaporator.

8. In a method of operation of an absorption system including an absorber, an evaporator, a generator, a condenser and a heat exchanger for strong and weak solutions and employing a saline solution as an absorbent and a material miscible therewith as a refrigerant, the steps which consist in supplying weak solution from the absorber to the generator, supplying strong solution from the generator to the absorber, supplying a heating medium to the generator in heat exchange relation with solution therein, supplying a condensing medium to the condenser in heat exchange relation with vapor therein to condense the same, returning the condensate to the evaporator, at partial load, varying the quantity of weak solution passing from the absorber to the generator without affecting the passage of condensing medium through the condenser and passage of heating medium through the generator thereby precipitating salt from solution in the generator, and, upon an increase in load imposed upon the system, increasing the quantity of weak solution passing from the absorber to the generator to dissolve salt therein thereby increasing the capacity of the system.

9. A method according to claim 8 in which the diverted weak solution is mixed with strong solution prior to the passage of strong solution through the heat exchanger.

10. A method according to claim 9 in which the quantity of weak solution diverted is responsive to load imposed upon the system as reflected by the temperature of cooled medium leaving the evaporator.

11. In an absorption refrigeration system, the combination of an absorber, an evaporator, a generator, a condenser, means for passing strong solution from the generator to the absorber, means for passing weak solution from the absorber to the generator, means for supplying heating medium to the generator, means for supplying condensing medium to the condenser, a heat exchanger for placing the strong and weak solutions in heat exchange relation during their passage between the absorber and generator, and means for diverting at least a portion of the weak solution prior to its passage in heat exchange relation with heating medium in the generator to mix with strong solution passing from the generator to the absorber prior to the passage of the strong solution through the heat exchanger.

12. An absorption refrigeration system according to claim 11 in which the diverting means are responsive to load imposed upon the system.

13. An absorption refrigeration system according to claim 11 in which means are provided to actuate the diverting means in response to the temperature of cooled medium leaving the evaporator.

14. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, a second line connecting the generator with the absorber through the heat exchanger permitting the supply of strong solution from the generator to absorber, means for supplying condensing medium to the condenser, means for supplying heating medium to the generator, means to connect the first line to the second line to divert weak solution from the first line to the second line, and means to regulate the quantity of weak solution diverted from the first line to the second line without affecting the passage of condensing water through the condenser and supply of heating medium to the generator.

15. An absorption refrigeration system according to claim 14 in which said diverting means are so placed as to mix weak solution with strong solution prior to the passage of strong solution through the heat exchanger.

16. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, a second line connecting the generator with the absorber through the heat exchanger permitting the supply of strong solution from the generator to the absorber, means for supplying condensing medium to the condenser, means for supplying heating medium to the generator, a third line connecting the first line and the second line, a modulating valve placed at the juncture of the first and third lines, and a control to actuate said valve, said control being responsive to the temperature of cooled medium leaving the evaporator to actuate the valve to vary the amount of weak solution mixed with strong solution in the strong solution line prior to the passage of strong solution through the heat exchanger.

17. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, a second line connecting the generator with the absorber through the heat exchanger permitting the supply of strong solution from the generator to the absorber, means for circulating a solution of intermediate concentration from the lower portion of the absorber to the upper portion of the absorber means for supplying condensing medium to the condenser, means for supplying heating medium to the generator, means adapted at partial load to divert at least a portion of the weak solution from passage in heat exchange relation with heating medium in the generator thereby precipitating salt from solution in the generator, said means being responsive to an increase in load upon the system to increase the quantity of weak solution passing in heat exchange relation with heating medium in the generator to dissolve the precipitated salt.

18. In an absorption refrigeration system employing a saline solution as an absorbent and a material miscible therewith as a refrigerant, the combination of a generator, a condenser, a solution heat exchanger for placing strong and weak solutions in heat exchange relation, means for supplying condensing medium to the condenser, means for supplying heating medium to the generator, means for passing weak solution from the heat exchanger to the generator, means for passing strong solution from the generator to the heat exchanger, means for circulating a solution of intermediate concentration from the lower portion of the absorber to the upper portion of the absorber and means adapted upon partial load imposed on the system to precipitate salt from solution in the generator thereby decreasing the capacity of the system, said precipitating means, in response to an increase in load imposed on the system, permitting solution in the generator to dissolve the precipitated salt to increase the capacity of the system.

19. An absorption refrigeration system according to claim 18 in which said precipitating means diverts weak solution before passage in heat exchange relation with heating medium to mix with strong solution prior to its entrance into the heat exchanger.

20. In an absorption refrigeration system, the combination of an absorber, an evaporator, a generator, a condenser, a heat exchanger to place strong and weak solutions in heat exchange relation, a first line connecting the absorber with the generator through the heat exchanger, means for passing weak solution through the first line, a second line connecting the generator with the absorber through the heat exchanger permitting the supply of strong solution from the generator to the absorber, means for supplying condensing medium to the condenser, means for supplying heating medium to the generator, means adapted at partial load to divert at least a portion of the weak solution from passage in heat exchange relation with heating medium in the generator thereby precipitating salt from solution in the generator, said means being responsive to an increase in load upon the system to increase the quantity of weak solution passing in heat exchange relation with heating medium in the generator to dissolve the precipitated salt, the diverted weak solution being mixed with strong solution prior to its passage through the heat exchanger.

21. In a method of regulating the operation of an absorption refrigeration system employing a saline solution as an absorbent and a material miscible therewith as a refrigerant, the steps which consist in precipitating salt from solution in the generator in response to a decrease in load imposed upon the system without interference with flow of condensing medium and supply of heating medium to the generator, and, upon an increase in load, dissolving the precipitated salt in solution in the generator to increase the capacity of the system without interference with flow of condensing medium through the condenser and supply of heating medium to the generator.

22. In a method of operation of an absorption refrigeration system including an absorber, an evaporator, a generator, a condenser and a heat exchanger for strong and weak solution and employing a saline solution as an absorbent and a material miscible therewith as a refrigerant, the steps which consist in supplying weak solution from the absorber to the generator, supplying strong solution from the generator to the absorber, supplying a heating medium to the generator in heat exchange relation with vapor therein to condense the same, returning the condensate to the evaporator, upon a decrease in load, reducing the quantity of weak solution passing from the absorber to the generator without affecting the passage of condensing medium through the condenser, mixing at least a portion of the weak solution not passing to the generator with strong solution prior to the passage of the strong solution to the absorber, and, upon an increase in load imposed upon the system, increasing the quantity of weak solution passing from the absorber to the generator without affecting the passage of condensing medium through the condenser.

References Cited in the file of this patent

UNITED STATES PATENTS

| | | |
|---|---|---|
| 2,550,429 | Reid | Apr. 24, 1951 |
| 2,582,837 | Leonard | Jan. 15, 1952 |
| 2,648,957 | Berestneff | Aug. 18, 1953 |
| 2,679,733 | Ashley | June 1, 1954 |
| 2,722,806 | Leonard | Nov. 8, 1955 |
| 2,738,653 | Berry | Mar. 20, 1956 |
| 3,005,318 | Miner | Oct. 24, 1961 |